(12) United States Patent
Alford et al.

(10) Patent No.: US 7,199,325 B2
(45) Date of Patent: Apr. 3, 2007

(54) METHOD FOR INTERCONNECTING TUBULARS BY FORGE WELDING

(75) Inventors: Robert Andrew Alford, Rijswijk (NL);
Anthony Thomas Cole, Rijswijk (NL);
Klisthenis Dimitriadis, Rijswijk (NL)

(73) Assignee: Shell Oil Company, Houston, TX (US)

( * ) Notice: Subject to any disclaimer, the term of this patent is extended or adjusted under 35 U.S.C. 154(b) by 57 days.

(21) Appl. No.: 10/500,316

(22) PCT Filed: Dec. 31, 2002

(86) PCT No.: PCT/EP02/14865

§ 371 (c)(1),
(2), (4) Date: Jun. 28, 2004

(87) PCT Pub. No.: WO03/055635

PCT Pub. Date: Jul. 10, 2003

(65) Prior Publication Data

US 2005/0092715 A1    May 5, 2005

(30) Foreign Application Priority Data

Dec. 31, 2001 (EP) .................................. 01205146

(51) Int. Cl.
*B23K 31/02* (2006.01)
(52) U.S. Cl. ..................... 219/61.2; 219/61.6
(58) Field of Classification Search ............... 219/61.2, 219/61.6, 61.4, 67, 55, 607, 86.1, 86.22
See application file for complete search history.

(56) References Cited

U.S. PATENT DOCUMENTS

| | | | |
|---|---|---|---|
| 2,719,207 A | 9/1955 | Moyer | |
| 3,625,258 A * | 12/1971 | Phelps | 138/115 |
| 4,216,896 A * | 8/1980 | Chang et al. | 228/212 |
| 4,566,625 A | 1/1986 | Moe | 228/265 |
| 4,669,650 A | 6/1987 | Moe | 228/219 |
| 4,728,760 A | 3/1988 | Brolin et al. | |
| 4,736,084 A * | 4/1988 | Moe | 219/61.2 |

(Continued)

FOREIGN PATENT DOCUMENTS

EP    0396204    8/1993

(Continued)

OTHER PUBLICATIONS

International Search Report dated Apr. 30, 2003.

(Continued)

*Primary Examiner*—Kevin Kerns
*Assistant Examiner*—Michael Aboagye (57) ABSTRACT

A method for interconnecting tubulars by forge welding involves arranging the tubular ends that are to be interconnected at a distance, up to a few millimeters from each other in a shield gas chamber, into which a reducing non-explosive flushing fluid mixture (e.g. $N_2+H_2$) is injected; heating each tubular end within the space by means of at least three electrodes that are pressed at circumferentially spaced intervals against the wall of each tubular, adjacent to the tubular end such that a high frequency electrical current is transmitted in a substantially circumferential direction through the tubular segments between the electrodes; and moving the thus uniformly heated tubular ends towards each other until a forge weld is formed between the heated tubular ends.

24 Claims, 3 Drawing Sheets

U.S. PATENT DOCUMENTS

| | | | | |
|---|---|---|---|---|
| 4,947,462 A | | 8/1990 | Moe | 219/8.5 |
| 5,163,604 A | | 11/1992 | Moe | 228/173.2 |
| 5,347,101 A | * | 9/1994 | Brennan et al. | 219/124.34 |
| 5,349,152 A | * | 9/1994 | Renner | 219/99 |
| 5,652,389 A | * | 7/1997 | Schaps et al. | 73/643 |
| 5,686,002 A | * | 11/1997 | Flood et al. | 219/137 R |
| 5,721,413 A | | 2/1998 | Moe | 219/61.2 |
| 5,760,307 A | | 6/1998 | Latimer et al. | 73/643 |
| 5,770,832 A | | 6/1998 | Carnes et al. | 219/109 |
| 5,777,229 A | | 7/1998 | Geier et al. | 73/624 |
| 6,155,117 A | | 12/2000 | Stevens et al. | 73/643 |
| 6,237,836 B1 | * | 5/2001 | Farwer | 228/219 |
| 6,288,373 B1 | * | 9/2001 | Jahn et al. | 219/607 |
| 2001/0017292 A1 | * | 8/2001 | Belloni et al. | 219/125.11 |

FOREIGN PATENT DOCUMENTS

| | | |
|---|---|---|
| WO | 98/33619 | 8/1998 |
| WO | 00/43630 | 7/2000 |
| WO | 00/43631 | 7/2000 |

OTHER PUBLICATIONS

Oil and Gas Jrnl, Nov. 28, 1994, pp. 64-67, Adjunta, et al. "Wellhead monitors automate Lake Maracaibo gas lift".

* cited by examiner

METHOD FOR INTERCONNECTING TUBULARS BY FORGE WELDING

The present application claims priority on European Patent Application 01205146.2 filed 31 Dec. 21.

FIELD OF THE INVENTION

The invention relates to a method and system for interconnecting tubulars by forge welding.

BACKGROUND OF THE INVENTION

It is known from U.S. Pat. No. 4,669,650 to forge weld tubular ends in a reducing environment, wherein a flushing gas, for example hydrogen having less than 100 ppm $H_2O$ and/or $O_2$ is flushed around the heated tubular ends to inhibit corrosion and to reduce and flush off an oxidized skin. A disadvantage of using hydrogen as flushing gas is that it will react with oxygen in the atmosphere in an explosive fashion so that it cannot be used in hazardous areas such as on an offshore oil and/or gas production platform or on an oil and/or gas well drilling rig. This prior art reference mentions on page 2, lines 65–68 that instead of using a reducing gas an inert gas may be used as flushing gas and discloses that the tubular end may be heated by means of an induction coil or by means of an unspecified method of high frequency heating.

International patent application WO98/33619 discloses a method for joining oilfield tubulars by diffusion bonding, wherein the tubular ends are heated by an induction coil inside a cavity filled with a shield gas. European patent 0396204 discloses a method for friction welding of well tubulars, wherein a ring is rotated at high speed in a cavity filled with shield gas and the tubular ends are pressed against the ring whereupon the ring and tubular end melt together.

U.S. Pat. No. 5,721,413 discloses a method of heating closely spaced portion of two pipes by heating each pipe end by a pair of diametrically opposite contacts, and the contacts of each pair are arranged in a specific crossed configuration relative to the contacts of the other pair to equalize heating of the pipe ends.

It is an object of the present invention to provide a forge welding method, which is able to interconnect tubular ends with a minimum of oxidized metal inclusions also in hazardous areas, such as on an offshore oil and/or gas production platform or on an oil and/or gas well drilling rig, in a safe and efficient manner and such that the tubular ends are heated in a substantially uniform manner such that a high quality forge weld is created even if the tubulars have an irregular shape.

SUMMARY OF THE INVENTION

The method according to the invention comprises: arranging the tubular ends that are to be interconnected at a selected distance from each other in a space, which is substantially filled with a flushing fluid mixture; heating each tubular end within said space by means of high frequency electrical heating wherein use is made of at least three electrodes that are pressed at circumferentially spaced intervals against the wall of each tubular adjacent to the tubular end such that the electrodes transmit a high frequency electrical current in a substantially circumferential direction through the tubular segment between the electrodes; and moving the tubular ends towards each other until a forge weld is formed between the heated tubular ends.

In a preferred embodiment of the method according to the invention the tubular ends are heated by at least two pairs of electrodes and the electrodes of each pair of electrodes are pressed at substantially diametrically opposite positions against the tubular wall. Said different pairs of diametrically opposite electrodes at each tubular end may be activated in an alternating manner.

The tubulars may have an irregular shape and/or may constitute a multibore tubular assembly and the electrodes may be positioned at such irregular angular intervals relative to a longitudinal axis of the tubulars that the tubular ends are heated in a substantially equal manner.

During the heat up phase and until the tubular ends are pressed together to form a forge weld it is preferred to flush along the heated pipe ends a flushing fluid mixture comprising a mixture comprising less than 25% by volume of a reducing fluid, such as hydrogen or carbon monoxide and more than 75% by volume of a substantially inert gas, such as nitrogen, carbon dioxide and/or a noble gas, such as argon.

The flushing fluid mixture may be formed in-situ in the form of a flushing fluid gas, by painting or spraying a liquid or solid reducing agent at the tubular ends and injecting an inert gas into said space, whereupon the reducing agent is at least partly evaporated when the tubular ends are heated and the evaporated reducing agent is mixed with the injected inert gas to form the flushing fluid gas. The liquid or solid reducing agent may comprise a cleaning liquid, such as hydrochloric acid, and a reducing agent, such as hydrogen peroxide, borax powder and/or an alkaline or beryllium hydride.

The flushing fluid mixture preferably comprises between 2 and 15% by volume of reducing fluid and between 85 and 98% by volume of a substantially inert gas.

The invention also relates to a forge welding system, which comprises a gripping assembly for arranging the tubular ends that are to be interconnected at a selected distance from each other in a space, flushing fluid injection means for filling said space with a flushing fluid mixture; an electrode assembly for heating each tubular end within said space by means of high frequency electrical heating wherein the electrode assembly comprises at least three electrodes that are pressed at circumferentially spaced intervals against the wall of each tubular adjacent to the tubular end such that the electrodes transmit in use a high frequency electrical current in a substantially circumferential direction through the tubular segment between the electrodes; and means for inducing the gripping assembly to press the heated tubular ends against each other until a forge weld is formed between the heated tubular ends.

The gripping assembly may be configured to maintain the tubular ends at a predetermined spacing during the heating phase and comprises a mechanical-stop which is configured to interrupt the axial movement of the heated tubular ends during the forge welding process when the heated tubular ends have moved along a predetermined distance towards and squeezed into each other.

The use of three or more circumferentially spaced electrodes in the method and system according to the invention reduces unequal heating of the pipe ends as a result of overheating of the pipe wall in the direct vicinity of the electrode and a reduced heating of the pipe wall halfway between the electrodes.

The electrode assembly may also be configured to give the forge welded tubular ends a post weld heat treatment wherein the tubular ends are cooled down in accordance with a predetermined temperature decrease.

The assembly may also be equipped with water and/or forced air injectors to increase and/or control the cool down rate of the forge welded tubular ends.

Suitably, the quality of the forge weld formed between the interconnected tubulars is inspected by means of an Electro-Magnetic Acoustic Transmission weld inspection technique, which is known as EMAT and described in U.S. Pat. Nos. 5,652,389; 5,760,307; 5,777,229 and 6,155,117, wherein an electromagnetic coils are placed adjacent to both sides of the forge welded joint and held at a predetermined distance from the tubulars during the inspection process. The absence of physical contact between the wall of the hot tubulars and the coils of the EMAT inspection tool enables weld inspection immediately after the forge weld joint has been made. The foregoing features of the method and system according to the invention may be combined in different ways and some preferred embodiments of the method and system according to the invention will be described in more detail with reference to the accompanying drawings.

BRIEF DESCRIPTION OF THE DRAWING

The invention will be described in more detail and by way of example with reference to the accompanying drawings in which.

DETAILED EMBODIMENT OF THE INVENTION

Figure 1:
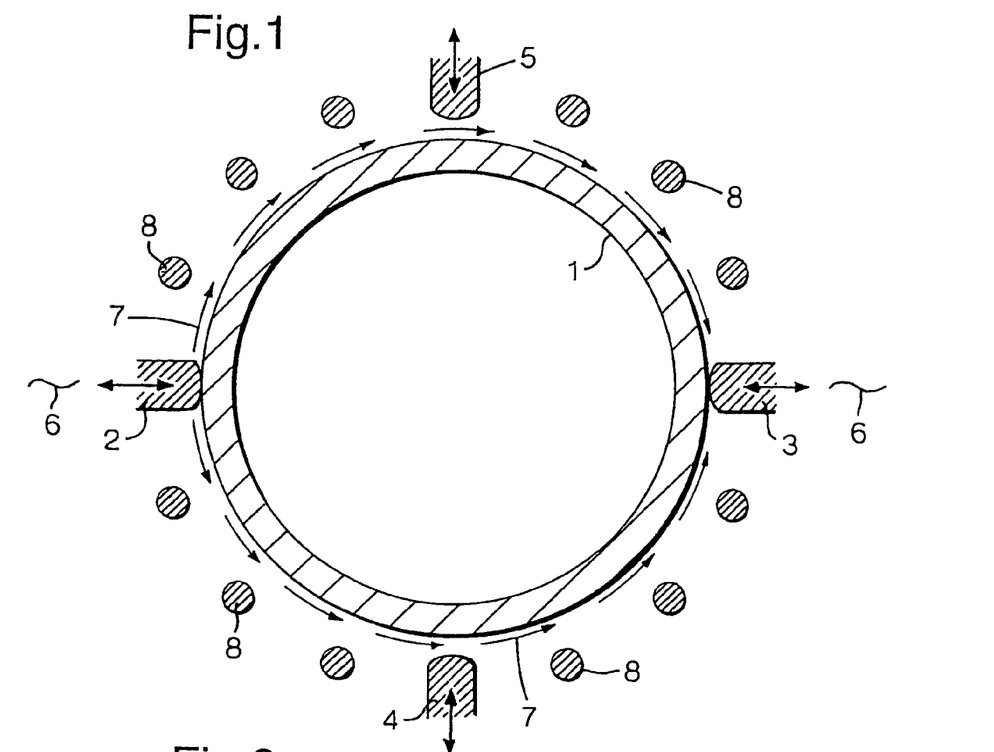
FIG. 1 depicts a cross-sectional view of a tubular end which is heated by two pairs of diametrically opposite electrodes.

Referring to FIG. 1 there is shown an end of a steel tubular 1 around which two pairs of diametrically opposite electrodes 2, 3 and 4, 5 are arranged.

The first pair of electrodes 2, 3 is pressed against the outer surface of the tubular 1 and transmit a high frequency current 6 through the wall of the tubular as illustrated by arrows 7. An assembly of ferrite bars 8 serves to enhance the current density in the immediate vicinity of the ends of the tubular 1 and of the adjacent tubular (not shown).

Figure 2:
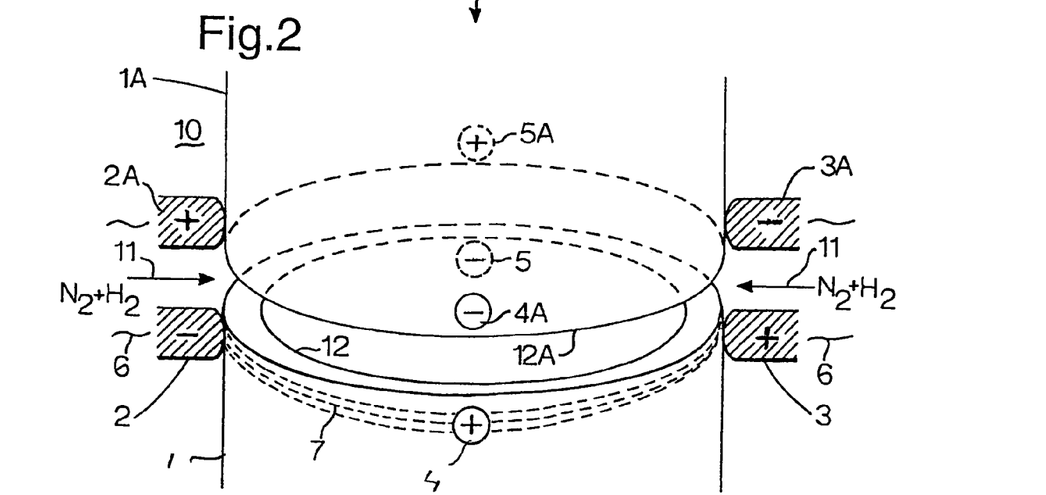
FIG. 2 depicts a three-dimensional view of the tubular depicted in FIG. 1 before it is connected to another tubular by the forge welding method according to the invention.

FIG. 2 shows how the ends 12, 12A of two adjacent tubulars 1 and 1A are each heated by two sets of diametrically opposite electrodes 2, 3, 4, 5 and 2A, 3A, 4A and 5A, respectively. The tubular ends 12 and 12A are located at a few millimeters distance from each other during the heat up phase. The larger spacing of current density arrows 7 and 7A midway between the electrodes 2, 3 and 2A, 3A illustrate that the current density midway these electrodes is lower than the current density adjacent to the electrodes 2, 3 and 2A, 3A. This creates variation in the heating rate of the tubular ends 12 and 12A and reduced heating in the area midway the electrodes 2, 3 and 2A, 3A. To reduce the irregular heating rate the electrodes 2, 3 and 2A, 3A are regularly lifted from the outer surface of the tubulars 1, 1A whereupon the other electrodes 4, 4A and 5, 5A are pressed against the outer surface of the tubulars 1, 1A and activated to transmit a high frequency current through the ends of the tubulars 1, 1A. By sequentially activating the two sets of diametrically opposite electrodes at each tubular end the irregularity of the heating of the tubular ends is reduced.

Alternatively the electrodes 2–5 and 2A–5A that are shown in FIG. 2 may be pressed simultaneously against the spaced tubular ends 1 and 1A if the alternating current is controlled, for example by thyristors, such that at during a first part of said cycle the diametrically opposite electrode pairs 2A and 3 transmit a positive electrical current as indicated by the + sign in FIG. 2, whereas the other electrodes 2 and 3A transmit a negative electrical current as indicated by the – sign in FIG. 2. During a second part of the alternating current cycle, on the other hand, the electrodes 2A and 3 will transmit a negative electrical current, whereas the other electrodes 2 and 3A will transmit a positive current into the tubulars 1 and 1A, thereby heating the tubular ends 12 and 12A in a substantially equal manner.

During a next phase of the heating cycle the electrodes 2, 2A and 3, 3A are inactive and the other electrodes 4, 5, 4A and 5A are activated in a similar manner.

The temperature of the heated tubular ends 12, 12A is monitored by an infrared temperature sensor and when the monitored temperature is suitable to make a forge weld the tubular ends 12, 12A are pressed onto each other such that a forge weld is made. The tubular ends 12, 12A may be profiled and have a smaller wall thickness than other parts of the tubulars 1, 1A in order to compensate for the deformation of the tubular end 12 and 12A that are red hot during the forge welding process, such that the forged welded tubulars 1, 1A have a uniform wall thickness and internal and external diameter.

During the heat up phase and while the ends of the tubulars 1, 1A are moved towards each other the tubular ends are encased, both internally and externally, in a chamber 10 which is filled with a non-explosive flushing gas mixture which comprises more than 75 vol % of nitrogen and less than 25 vol % of hydrogen. A preferred non-explosive flushing gas mixture for interconnecting carbon steel tubulars 1, 1A comprises about 5 vol % of hydrogen and about 95 vol % of nitrogen. The flushing gas pressure in the part of the chamber 10 outside the tubulars 1 and 1A is higher than the flushing gas pressure in the part of the chamber 10 within the interior the tubulars 1 and 1A, such that throughout the heating process the flushing gas flows along the ends 12, 12A of the tubulars 1, 1A as illustrated by arrows 11 until the ends of the tubulars are forged together.

The hydrogen in the flushing gas reacts with the oxygen in any oxidised skin on the ends 12, 12A of the to be interconnected tubulars 1, 1A so that the oxidised skin is at least substantially eliminated and clean metal parts are forged together with a minimal amount of corroded metal inclusions.

Laboratory experiments revealed that a good metallurgical bond between carbon steel tubulars is obtained by the above described forge welding method, wherein the flushing fluid contained about 5 vol % of hydrogen and about 95 vol % of nitrogen. The experiments also confirmed the non-explosive nature of this flushing gas composition.

Preferably the tubular ends are clamped throughout the forge welding process to a gripping assembly, which maintains the tubular ends at a predetermined spacing of between 1 and 3 millimeters from each other during the heating phase and which comprises a mechanical stop which interrupts the axial movement of the heated tubular ends during the forge welding process when the heated tubular ends have moved along a predetermined distance towards and squeezed into each other such that a high quality forge weld is created without an excessive deformation of the heated tubular ends.

Suitably the electrodes 2–5 and 2A–5A may also be activated to give the forge welded tubular ends a post weld heat treatment. The electrical power 6 supplied to the electrodes during the post weld heat treatment will be lower than during the heat up phase before the forge welding operation and may be controlled in conjunction with the temperature measured by the infrared temperature sensor(s) such that the temperature of the forge welded tubular ends is decreased in accordance with a predetermined pattern.

The quality of the forge weld made may be inspected instantly after the weld has been made by means of a hybrid electromagnetic acoustic transmission technique known as EMAT. The EMAT technique makes use of an induction coil placed at one side of the welded joint, which coil induces magnetic fields that generate electromagnetic forces in the surface of the welded joint. These forces then produce a mechanical disturbance by coupling to the atomic lattice through a scattering process. In electromagnetic acoustic generation, the conversion takes place within a skin depth of material, i.e. the metal surface is its own transducer. The reception takes place in a reciprocal way. When the elastic wave strikes the surface of the conductor in the presence of a magnetic field, induced currents are generated in the receiving coil, similar to the operation of an electric generator. An advantage of the EMAT weld inspection technology is that the inductive transmission and receiving coils do not have to contact the welded tubular. Thus the quality inspection can be done instantly after the forge weld is made, when the forge welded tubulars are still too hot to allow physical contact with an inspection probe.

The method and system according to the invention are particularly useful for welding oilfield and/or well tubulars at or near an oil/and or gas production rig. The tubulars may be production tubing strings of several kilometers length that are lowered into the well after the tubing sections have been welded together.

Alternatively, the oilfield tubulars may be heating pipes that are inserted into a heater well which transmits heat into the surrounding kerogen and/or oil bearing formation to reduce the viscosity and/or pyrolyse the kerogen and/or other hydrocarbons in-situ. Such heating pipes may consist of a pair of co-axial pipes, which form an electrical circuit through which an electrical current is transmitted to produce heat.

It is preferred that such heater or production tubing strings are welded together when the welded tubulars extend in a substantially horizontal position on a tube assembly line at the earth surface whereupon the tubulars are bent and inserted into the heater or production well. A suitable bending and insertion technique is disclosed in International patent applications WO 00/43630 and WO 00/43631, which are incorporated herein by reference. Preferably the well tubulars are welded together in a horizontal welding assembly near the wellhead and then coiled in a big loop that forms an arch of at least 270 degrees such that the proximal end of the tubing string extends vertically into the wellhead whereas the distal end of the tubing string extends horizontally through the welding assembly. Alternatively the welded well tubulars are welded together horizontally and then coiled in a big loop at a small distance from the wellhead. When the entire tubing string has been assembled and coiled into said big loop, the assembled tubing string is transported e.g. on a rail track to the wellhead and then inserted into the wellhead as disclosed in International patent application WO 00/43631. The latter tube assembling technique allows assembly of the tubular strings at a central welding assembly which is located at a central point above the oilfield where several tubular strings may be assembled and stored until they are transported to the wellhead and then quickly inserted into the well or wells such that the disruption of the well production and/or heating operations is minimal.

Figure 3:
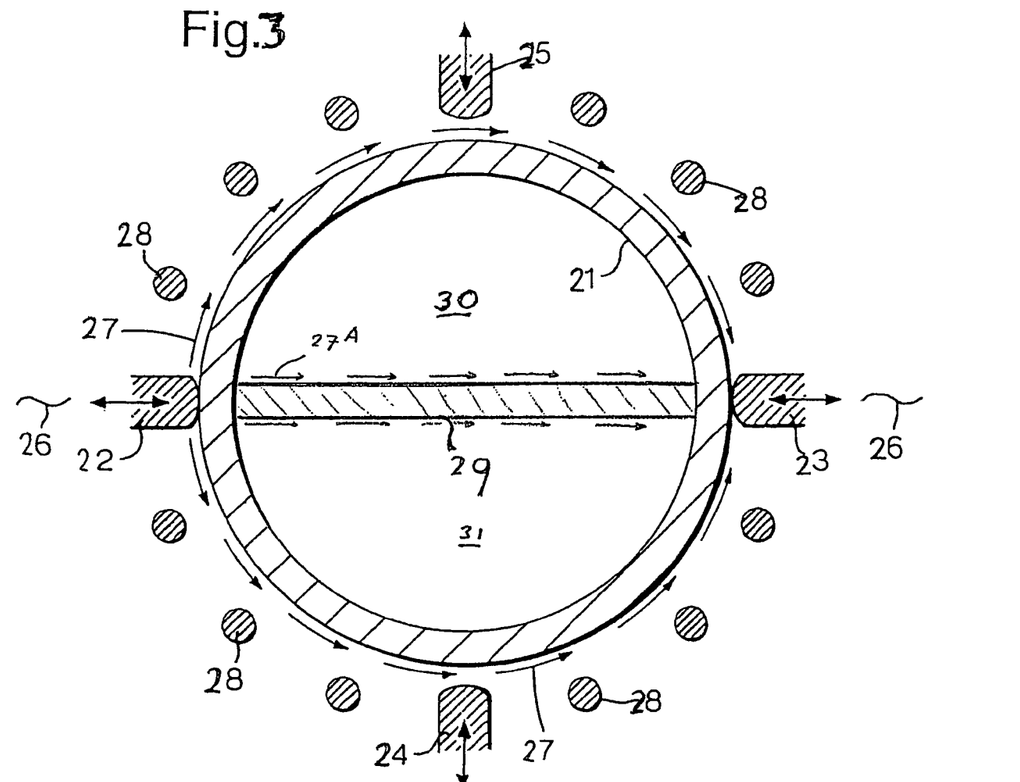
FIG. 3 depicts a cross-sectional view of a multibore tubular end which is heated by two pairs of diametrically opposite electrodes.

FIG. 3 shows an end of a steel multibore tubular 21 around which two pairs of diametrically opposite electrodes 22, 23 and 24, 25 are arranged. The tubular 1 comprises a longitudinal and diagonal separation wall 29, which creates two semi-cylindrical flow channels 30 and 31 in the interior of the tubular 21.

The first pair of electrodes 22, 23 is pressed against the outer surface of the tubular 21 and transmit a high frequency current 26 through the wall of the tubular 1 and the separation wall 29 as illustrated by arrows 27, 27A. An assembly of ferrite bars 28 serves to enhance the current density in the immediate vicinity of the ends of the tubular 21 and of the adjacent tubular (not shown). When the first diagonal set of electrodes 22, 23 are activated a majority of the high frequency electrical current will pass through the diagonal separation wall 29, thereby predominately heating the end of said separation wall 29, whereas when subsequently the second set of diagonal electrodes 24, 25 is activated a majority of the high frequency electrical current will pass through the wall of the tubular 21. The power supplied to the electrode sets 22, 23 and 24, 25 and the duration of the periods during which the electrode sets are alternatingly activated is controlled such that the ends of the walls of the tubular 21 and of the separation wall 29 are heated uniformly to a predetermined temperature.

Figure 4:
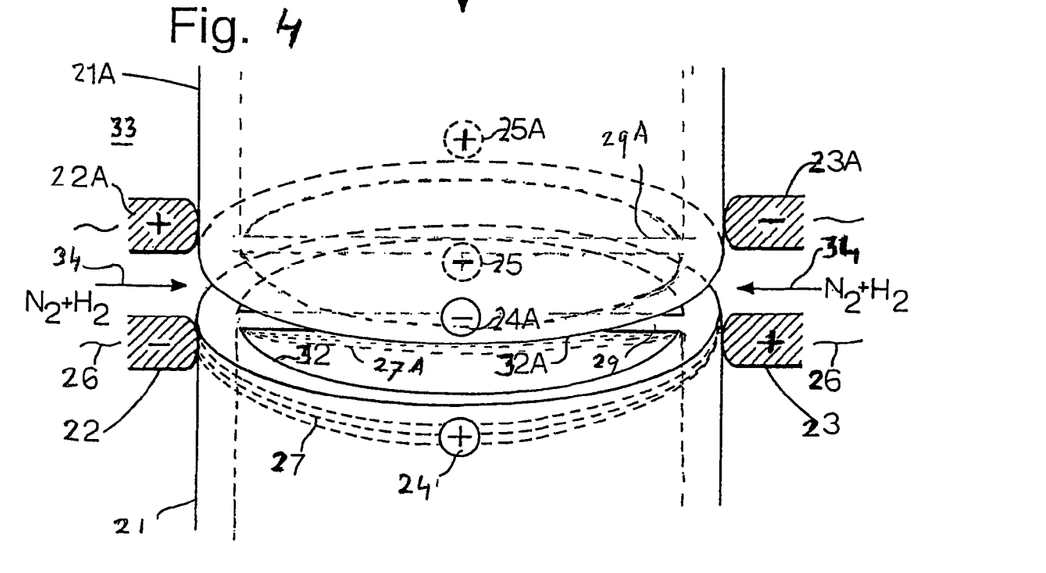
FIG. 4 depicts a three-dimensional view of the multibore tubular depicted in FIG. 3 before it is connected to another multibore tubular by the forge welding method according to the invention.

FIG. 4 shows how the ends 32, 32A of two adjacent multibore tubulars 21 and 21A are each heated by two sets of diametrically opposite electrodes 22, 23, 24, 25 and. 22A, 23A, 24A and 25A, respectively. The tubular ends 32 and 32A are located at up to a few millimeters distance from each other during the heat up phase in order to create a capacitance effect between the tubular ends 32 and 32A, which stimulates the electric current to flow at the tubular ends 32 and 32A. The larger spacing of current density arrows 27 and 27A midway between the electrodes 22, 23 and 22A, 23A illustrates that the current density midway these electrodes is lower than the current density adjacent to the electrodes 22, 23 and 22A, 23A. This creates variation in the heating rate of the tubular ends 32 and 32A and reduced heating in the area midway the electrodes 22, 23 and 22A, 23A. To reduce the irregular heating rate the electrodes 22, 23 and 22A, 23A may be regularly lifted from the outer surface of the tubulars 21, 21A whereupon the other electrodes 24, 24A and 25, 25A are pressed against the outer surface of the tubulars 21, 21A and activated to transmit a high frequency current through the ends of the tubulars 21, 21A. By sequentially activating the two sets of diametrically opposite electrodes at each tubular end the irregularity of the heating of the tubular ends is reduced.

All the electrodes 22–25 and 22A–25A that are shown in FIG. 4 may be pressed simultaneously against the spaced tubular ends 21 and 21A if the alternating current is controlled for example by thyristors such that at during a first part of said cycle the electrodes 22A and 23 transmit a positive electrical current as indicated by the + sign in FIG. 4, whereas the other electrodes 22, 23, 24A and 25A transmit a negative electrical current as indicated by the − sign in FIG. 4. During a second part of the alternating current cycle, on the other hand, the electrodes 22A and 23 will transmit a negative electrical current, whereas the other electrodes 22 and 23A, will transmit a positive current into the tubulars 21 and 21A, thereby heating the tubular ends 32 and 32A and the ends of the diagonal separation walls 29, 29A in a substantially uniform manner.

The temperature of the heated tubular ends 32, 32A and diagonal separation walls 29 and 29A may be monitored by a pyrometric infrared temperature sensor and when the monitored temperature is suitable to make a forge weld the tubular ends 32, 32A and opposite ends of the diagonal separation walls 29 and 29A are pressed onto each other such that a forge weld is made. The tubular ends 32, 32A may be profiled and have a smaller wall thickness than other parts of the tubulars 21, 21A in order to compensate for the deformation of the tubular ends 32 and 32A that are red hot during the forge welding process, such that the forged welded tubulars 21, 21A have a uniform wall thickness and internal and external diameter.

During the heat up phase and while the ends of the tubulars 21, 21A are moved towards each other the tubular ends are encased, both internally and externally, in a chamber 33 which is filled with a non-explosive flushing gas mixture which comprises more than 75 vol % of nitrogen and less than 25 vol % of hydrogen. A preferred non-explosive flushing gas mixture for interconnecting carbon steel tubulars 21, 21A comprises about 5 vol % of hydrogen and about 95 vol % of nitrogen. The flushing gas pressure in the part of the chamber 33 outside the tubulars 21 and 21A is higher than the flushing gas pressure in the part of the chamber 10 within the interior the tubulars 21 and 21A, such that throughout the heating process the flushing gas flows along the ends of the tubulars 21, 21A as illustrated by arrows 34 until the ends of the tubular ends 32 and 32A are forged together.

The hydrogen in the flushing gas reacts with the oxygen in any oxidised skin on the ends 32, 32A of the to be interconnected tubulars 21, 21A so that the oxidised skin is at least substantially eliminated and clean metal parts are forged together with a minimal amount of corroded metal inclusions.

Preferably the tubular ends are clamped throughout the forge welding process to a gripping assembly, which maintains the tubular ends at a predetermined spacing of between 1 and 3 millimeters from each other during the heating phase and which comprises a mechanical stop which interrupts the axial movement of the heated tubular ends during the forge welding process when the heated tubular ends have moved along a predetermined distance towards and squeezed into each other such that a high quality forge weld is created without an excessive deformation of the heated tubular ends.

Suitably the electrodes 22–25 and 22A–25A may also be activated to give the forged tubular ends a post weld heat treatment. The electrical power 26 supplied to the electrodes during the post weld heat treatment will be lower than during the heat up phase before the forge welding operation and may be controlled in conjunction with the temperature measured by the infrared temperature sensor(s) such that the temperature of the forge welded tubular ends is decreased in accordance with a predetermined pattern.

FIGS. 5 to 10 depict various multibore conduit configurations which may be heated in a substantially uniform manner by different configurations of circumferentially distributed electrode assemblies.

Figure 5:
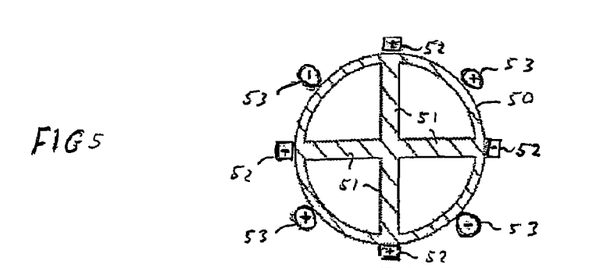
FIGS. 5–10 depict various multibore conduit configurations of which the ends can be heated in a substantially uniform manner by using assemblies of three or more electrodes in accordance with the invention.

FIG. 5 depicts an end of a cylindrical tubular 50 of which the interior is divided into four flow channels by two diagonal separation walls 51 which intersect each other orthogonally. A set of eight electrodes is arranged at 45 degree intervals around the outer surface of the tubular 50, which set comprises four primary electrodes 52 shown as squares and four secondary electrodes 53 shown as circles. The primary electrodes 52 and secondary electrodes 53 are activated in an alternating manner and when the primary electrodes are activated these primary electrodes 52 pass a high frequency electrical current primarily into the ends of the diagonal separation walls 51, whereas when the secondary electrodes 53 are subsequently activated these secondary electrodes 53 pass a high frequency electrical current into the wall of the tubular 50. The primary and secondary electrodes 52 and 53 are sequentially activated until the ends of the tubular 50 and separation wall 51 have reached a predetermined temperature, whereupon the heated ends of the tubular 50 and separation wall 51 are pressed against the adjacent end of another tubular (not shown) which is also provided with two diagonal separation walls (not shown) in a manner substantially similar as described with reference to FIG. 4.

Figure 6:
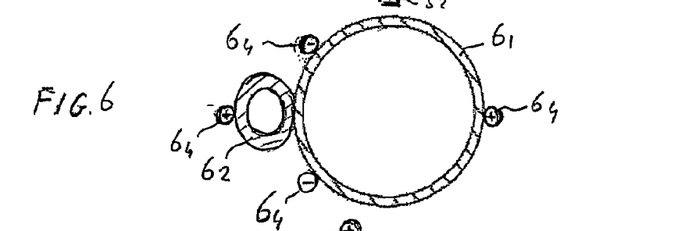

FIG. 6 depicts a multibore tubular assembly, which comprises a large diameter steel pipe 61 that has been welded to a small diameter steel pipe 62. A set of four electrodes 64 is pressed at selected angular intervals against the outer surfaces of the pipes 61 and 62 such that the ends of the pipes 61 and 62 are heated in a substantially uniform manner by a high frequency electrical current injected into the pipe ends by the electrodes 64. A uniform heating of the pipe ends may be further promoted by variation of the electrical power and or voltage supplied to the various electrodes 64 and/or by cyclically activating different pairs of electrodes 64.

Figures 7, 8:
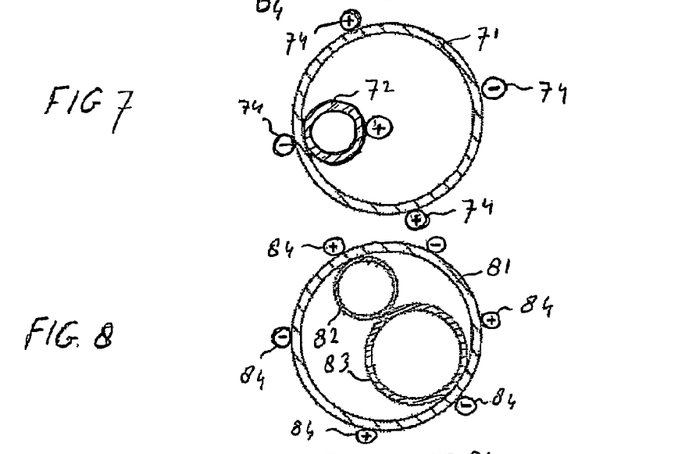

FIG. 7 depicts a multibore tubular assembly, which comprises a large diameter steel pipe 71 in which a small diameter steel pipe 72 has been welded. A set of four electrodes 74 is pressed at selected angular intervals against the surfaces of the pipes 71 and 72. The continuously alternating polarities of the electrodes 74 are such that a substantially uniform high frequency electrical current passes through the ends of the pipe segments between the electrodes 74, thereby heating the ends of both pipes 71 and 72 in a substantially uniform manner. One of the electrodes 74 is arranged in the interior of the large diameter steel pipe 71 by means of a mandrel that may be inserted into the large diameter pipe 71 during the forge welding process and which is retrieved from the pipe interior after the forge welding operation.

FIG. 8 depicts a multibore tubular assembly, which comprises a large diameter steel pipe 81 in which two small diameter pipes 82 and 83 are welded. The pipe ends are heated by a set of six electrodes 84 which have different polarities and thereby inject a high frequency electrical current into the pipe segments between adjacent electrodes. The electrodes 84 may be activated cyclically and controlled by thyristors in order to heat the ends of the large and small diameter pipes 81, 82 and 83 in a substantially uniform manner.

Figure 9:
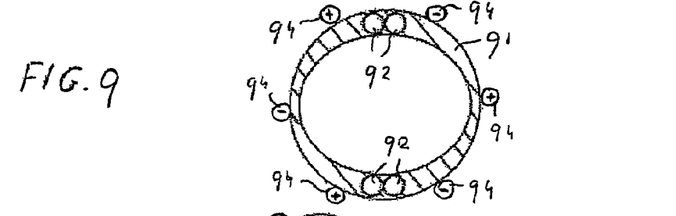

FIG. 9 depicts a multibore tubular assembly, which comprises a steel large diameter pipe 91 and two pairs of small diameter control conduits 92 that are arranged in the wall of the large diameter pipe 91 at diametrically opposite positions. A set of six electrodes 94 is pressed at selected angular intervals against the outer surface of the large diameter pipe 91 such that ends of the pipe 91 and of an adjacent similar pipe (not shown) are heated in a substantially uniform manner, whereupon the heated pipe ends are pressed together and a forge weld is formed.

Figure 10:
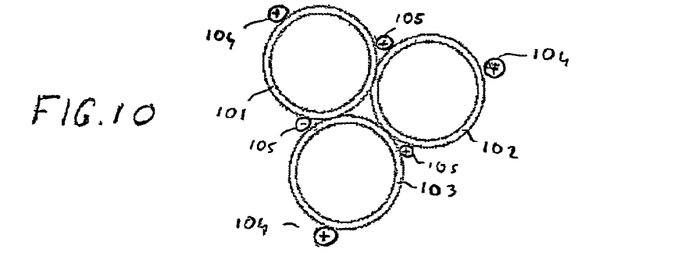

FIG. 10 depicts a multibore tubular assembly, which comprises a bundle of three steel pipes 101, 102 and 103 that are welded together. The ends of the pipes 101, 102 and 103 are heated in a substantially uniform manner by an assembly of three electrodes 104 that are cyclically activated as a rotating three phase assembly. Optionally a set of three other electrodes 105 may be arranged near the locations where the steel pipes 101, 102 and 103 are welded together in order to heat the pipe segments located in the central region of the bundle. The electrode assemblies 104 and 105 may be activated in an alternating manner and controlled such that the pipe ends are heated in a substantially uniform manner.

It will be understood that the + and − signs displayed in the illustrated electrode assembly are illustrative only and that the polarities of the different electrodes are changing continuously in a sinusoidal manner when a high frequency electrical current is passed via the electrodes into the adjacent segments of the walls of the tubulars of which the ends are to be forge welded together.

While the illustrative embodiments of the invention have been described with particularity, it will be understood that various other modifications will be readily apparent to, and can be easily made by one skilled in the art without departing from the spirit of the invention. Accordingly, it is not intended that the scope of the following claims be limited to the examples and descriptions set forth herein but rather that the claims be construed as encompassing all features which would be treated as equivalents thereof by those skilled in the art to which this invention pertains.

The invention claimed is:

1. A method for interconnecting tubulars by forge welding, each tubular comprising a wall and a tubular end, the method comprising: arranging the tubular ends of the tubulars that are to be interconnected at a selected distance from each other in a space, which is substantially filled with a flushing fluid mixture; forming heated tubular ends by heating each tubular end within said space by means of high frequency electrical heating wherein use is made of at least three electrodes that are pressed at circumferentially spaced intervals against the wall of each tubular adjacent to the tubular end to form electrical contacts, such that the electrodes transmit a high frequency electrical current in a substantially circumferential direction through a tubular segment between the electrical contacts; and moving the tubular ends towards each other until a forge weld is formed between the heated tubular ends to produce interconnected tubulars.

2. The method of claim 1, wherein the tubular ends are heated by at least two pairs of electrodes and the electrodes of each pair of electrodes are pressed at substantially diametrically opposite positions against the tubular wall.

3. The method of claim 2, wherein the different pairs of diametrically opposite electrodes at each tubular end are activated in an alternating manner.

4. The method of claim 2, wherein two pairs of diametrically opposite electrodes are pressed at angular intervals of substantially 90 degrees against the tubular wall.

5. The method of claim 2, wherein three pairs of diametrically opposite electrodes are pressed at angular intervals of substantially 60 degrees against the tubular wall.

6. The method of claim 1, wherein each tubular end has a substantially cylindrical shape and three electrodes are pressed against the wall of each tubular adjacent to the tubular end at angular intervals of substantially 120 degrees relative to a central axis of the tubular and wherein the electrodes that are pressed against the walls of adjacent tubulars form pairs of adjacent electrodes that are arranged in close proximity to each other and substantially in the same axial plane and the pairs of adjacent electrodes are actuated such that these electrodes have substantially opposite polarities.

7. A method for interconnecting tubulars by forge welding, each tubular comprising a wall and a tubular end, the method comprising: arranging the tubular ends of the tubulars that are to be interconnected at a selected distance from each other in a space, which is substantially filled with a flushing fluid mixture; forming heated tubular ends by heating each tubular end within said space by means of high frequency electrical heating wherein use is made of at least three electrodes that are pressed at circumferentially spaced intervals against the wall of each tubular adjacent to the tubular end to form electrical contacts, such that the electrodes transmit a high frequency electrical current in a substantially circumferential direction through a tubular segment between the electrical contacts; and moving the tubular ends towards each other until a forge weld is formed between the heated tubular ends to produce interconnected tubulars, wherein the tubulars have an irregular shape and the electrodes are positioned at selected angular intervals relative to a longitudinal axis of the tubulars such that the tubular ends are heated in a substantially equal manner.

8. The method of claim 7, wherein the tubulars are multibore tubulars.

9. The method of claim 8, wherein the multibore tubulars each comprise an enveloping pipe and one or more partitioning walls, which divide the interior of the enveloping pipe into at least two semi-cylindrical segments.

10. The method of claim 9, wherein the enveloping pipe comprises a partitioning wall which is secured in an electrically conductive manner to the inner wall of the enveloping pipe at substantially diametrically opposite positions relative to a central axis of the enveloping pipe.

11. The method of claim 8, wherein the multibore tubulars comprise an enveloping pipe and one or more small diameter pipes arranged in the interior of the enveloping pipe whereby the walls of the enveloping pipe and small diameter pipes are in electrical contact with each other.

12. The method of claim 8, wherein the multibore tubulars are formed by pipe bundles and the walls of the adjacent pipes are in electrical contact with each other.

13. The method of claim 1, wherein the flushing fluid mixture comprises a mixture comprising less than 25% by volume of a reducing fluid and more than 75% by volume of a substantially inert gas.

14. The method of claim 13, wherein the flushing fluid mixture is a mixture of a reducing fluid which comprises hydrogen and/or carbon monoxide and/or a liquid reducing agent and a substantially inert gas which comprises nitrogen and/or carbon dioxide and/or a noble gas such as argon.

15. The method of claim 13, wherein the flushing fluid mixture comprises between 2 and 15% by volume of reducing fluid and between 85 and 98% by volume of a substantially inert gas.

16. A method for interconnecting tubulars by forge welding, each tubular comprising a wall and a tubular end, the method comprising: arranging the tubular ends of the tubulars that are to be interconnected at a selected distance from each other in a space, which is substantially filled with a flushing fluid mixture; forming heated tubular ends by heating each tubular end within said space by means of high frequency electrical heating wherein use is made of at least three electrodes that are pressed at circumferentially spaced intervals against the wall of each tubular adjacent to the tubular end to form electrical contacts, such that the electrodes transmit a high frequency electrical current in a substantially circumferential direction through a tubular segment between the electrical contacts; and moving the tubular ends towards each other until a forge weld is formed between the heated tubular ends to produce interconnected tubulars, wherein a liquid or solid reducing agent is painted or sprayed at the tubular ends and an inert gas is injected into said space, whereupon the reducing agent is at least partly evaporated when the tubular ends are heated and the evaporated reducing agent is mixed with the injected inert gas to form the flushing fluid in-situ in the form of a flushing gas mixture comprising less than 25% by volume of evaporated reducing agent and more than 75% by volume of a substantially inert gas.

17. The method of claim 16, wherein the liquid or solid reducing agent comprises a reducing agent, such as hydrogen peroxide, borax powder and/or an alkaline or beryllium hydride.

18. The method of claim 1, wherein the tubulars are oilfield or well tubulars.

19. The method of claim 1, wherein the quality of the forge weld formed between the interconnected tubulars is inspected by means of an electromagnetic acoustic inspection technique, which is known as EMAT and wherein induction coils are placed at both sides of the forge weld, which coils are held at a predetermined distance from the tubulars during the inspection process.

20. A system for use in a method for interconnecting tubulars by forge welding, each tubular comprising a wall and a tubular end, the system comprising a gripping assembly for arranging the tubular ends of the tubulars that are to be interconnected at a selected distance from each other in a space, flushing fluid injection means for filling said space with a flushing fluid mixture; an electrode assembly for heating each tubular end within said space and form heated tubular ends by means of high frequency electrical heating wherein the electrode assembly comprises at least three electrodes that are pressed at circumferentially spaced intervals against the wall of each tubular adjacent to the tubular end to form electrical contacts, such that the electrodes transmit in use a high frequency electrical current in a substantially circumferential direction through a tubular segment between the electrodes; and means for inducing the gripping assembly to press the heated tubular ends against each other until a forge weld is formed between the heated tubular ends.

21. The system of claim 20, wherein the gripping assembly is configured to maintain the tubular ends at a predetermined spacing during the heating of each tubular end, and comprises a mechanical stop which is configured to interrupt the axial movement of the heated tubular ends during the forge welding process when the heated tubular ends have moved along a predetermined distance towards and squeezed into each other.

22. The method of claim 16, wherein the substantially inert gas comprises nitrogen and/or carbon dioxide and/or a noble gas such as argon.

23. The method of claim 16, wherein the liquid or solid reducing agent comprises a cleaning liquid, such as hydrochloric acid.

24. The method of claim 17, wherein the liquid or solid reducing agent comprises a cleaning liquid, such as hydrochloric acid.

* * * * *